United States Patent Office 3,246,004
Patented Apr. 12, 1966

3,246,004
NEW DYESTUFFS CONTAINING BENZAZOLYL-
MERCAPTO SUBSTITUENTS
Frank Hall, Robert Norman Heslop, Frank Lodge, Ian
Durham Rattee, and Frederick Andrew Waite, Manchester, England, assignors to Imperial Chemical Industries Limited, London, England, a corporation of Great Britain
No Drawing. Filed Dec. 31, 1962, Ser. No. 248,277
Claims priority, application Great Britain, Jan. 21, 1960,
2,246/60
6 Claims. (Cl. 260—303)

This application is a continuation-in-part of application Serial No. 82,221, filed on January 9, 1961, which is now abandoned.

This invention relates to new dyestuffs and more particularly it relates to new water-soluble dyestuffs which are valuable for colouring textile materials, in particular cellulose textile materials.

According to the invention there are provided the dyestuffs which are represented by the formua:

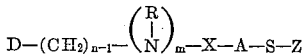

wherein

D is a dyestuff radical selected from the class consisting of azo, anthraquinone and phthalocyanine dyestuff radicals which contain at least one water-solubilising group selected from the class consisting of carboxylic acid and sulphonic acid groups;
A represents a lower alkylene radical;
X represents a bridging group selected from the class consisting of —$SO_2$— and —CO—;
R represents a member selected from the class consisting of hydrogen and lower alkyl;
$m$ and $n$ each independently represent a positive integer not exceeding 2; and
Z represents a member selected from groups of the formula:

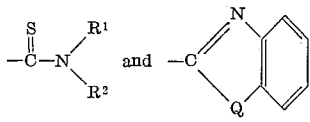

wherein $R^1$ and $R^2$ independently represent members selected from the class consisting of lower alkyl, phenyl and cyclohexyl, and $R^1$ and $R^2$ taken together represent with the nitrogen atom N a heterocyclic ring selected from the class consisting of piperidyl and morpholino;
Q represents a divalent atom selected from the class consisting of oxygen, sulphur and selenium atoms; and wherein any substituents on the benzene ring are selected from the class consisting of nitro, sulphonic acid and carboxylic acid groups.

The lower alkylene radicals represented by A are preferably alkylene radicals containing from 1 to 3 carbon atoms such as methylene, ethylene and trimethylene radicals, but it is preferred that A represents the ethylene radical.

The lower alkyl radicals represented by each of R, $R^1$ and $R^2$ are preferably alkyl radicals containing from 1 to 4 carbon atoms such as methyl, ethyl, n-propyl and n-butyl radicals.

The

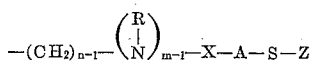

group present in the dyestuffs of the invention is attached to a carbon atom of an aryl ring, which is preferably a benzene ring, present in the dyestuff radical represented by D. The dyestuff radicals represented by D, particularly the dyestuff radicals of the azo and phthalocyanine series, may also contain coordinately bound metal atoms such as coordinately bound copper, cobalt or chromium atoms.

The dyestuffs of the invention may be obtained by treating a dyestuff compound of the formula:

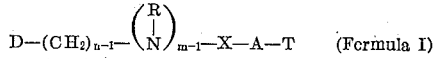

wherein D, A, X, R, $m$ and $n$ have the meanings stated, and T represents a bromine, or, preferably, a chlorine atom, with a sulphur compound of the formula:

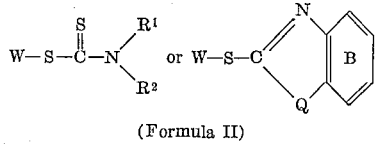

(Formula II)

wherein $R^1$, $R^2$ and Q have the meanings stated, W represents a hydrogen, sodium or potassium atom, and the benzene ring B can optionally be substituted by nitro, sulphonic acid or carboxylic acid groups.

The dyestuffs may be obtained by reacting the dyestuff compound of Formula I and the sulphur compound of Formula II together in water, or in a water-miscible organic liquid or in a mixture of water and a water-miscible organic liquid, preferably at a temperature between 40° C. and 100° C. and in the presence of an acid-binding agent such as sodium carbonate or sodium bicarbonate; and finally isolating by conventional methods the dyestuff so obtained.

As specific examples of the sulphur compounds of Formula II there may be mentioned 2-mercaptobenzthiazole, the sodium salt of 2-mercaptobenzthiazole, 2-mercapto-6-nitrobenzthiazole, 2-mercaptobenzoxazole, 2-mercaptobenzselenazole, 2-mercaptobenzthiazole-5-carboxylic acid, 2-mercaptobenzthiazole-5- or 6-sulphonic acid, sodium dimethyldithiocarbamate, sodium diethyldithiocarbamate, potassium di-n-propyldithiocarbamate, sodium di-n-butyl-dithiocarbamate, sodium pentamethylenedithiocarbamate, sodium N-methyl-N-cyclohexyldithiocarbamate, sodium N-methyl-N-ethyldithiocarbamate, sodium-N-methyl-N-phenyldithiocarbamate, sodium diphenyldithiocarbamate, sodium salt of morpholino-N-carbodithioic acid and sodium dicyclohexyldithiocarbamate.

The dyestuff compounds of Formula I wherein X represents —$SO_2$ and $m$ represents 1 may be obtained by reacting the corresponding dyestuff or dyestuff intermediate containing at least one —$(CH_2)_{n-1}$—$SO_2H$ group with a compound of the formula: T—A—T, wherein A, T and $n$ have the meanings stated above, and subsequently converting the dyestuff intermediate to a dyestuff.

The dyestuff compounds of Formula I wherein X represents —CO— and $m$ represents 1 may be obtained by converting a dyestuff intermediate or intermediates containing at least one —$(CH_2)_{n-1}$—CO—A—T group wherein A, T and $n$ have the meanings stated above, into a dyestuff containing the said group or groups. Thus for example a primary aromatic amine containing a chloroacetyl group can be diazotised and coupled with a coupling component to give an azo dyestuff containing a chloroacetyl group.

The dyestuff compounds of Formula I wherein $m$ represents 2 may be obtained by reacting the corresponding dyestuff containing at least one

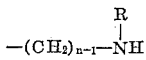

group wherein R and $n$ have the meanings stated above with an acid halide of the formula T—A—X-halogen wherein A, T and X have the meanings stated above.

Specific examples of dyestuff compounds of Formula I which can be used to obtain the dyestuffs of the invention are described in British specifications Nos. 740,533 and 779,818, and in Belgian specifications Nos. 560,032, 565,- 376, 565,448, 565,651, 565,700, 565,783, 570,437, 576,104, 576,105 and 577,140.

Alternatively the new dyestuffs, as hereinbefore defined, wherein A represents an ethylene radical, can be obtained by treating a dyestuff compound of the formula:

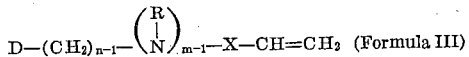

$$D-(CH_2)_{n-1}-\left(\underset{R}{\overset{}{N}}\right)_{m-1}-X-CH=CH_2 \quad \text{(Formula III)}$$

wherein D, R, X, $m$ and $n$ have the meanings stated above, with a sulphur compound of Formula II.

This modified process may be conveniently brought about by reacting the dyestuff compound of Formula III with the sulphur compound of Formula II in water, or in a water-miscible organic liquid such as acetone, or in a mixture of water and a water-miscible organic liquid, preferably at a temperature between 40° and 100° C., adding water and/or sodium chloride and isolating the dyestuff which is precipitated.

Specific examples of dyestuff compounds of Formula III are described in British specifications Nos. 712,037, 776,265, 779,781, 787,986 and 831,128, and in Belgian specifications Nos. 565,279, 565,447, 573,862 and 577,140.

Alternatively the new dyestuffs, as hereinbefore defined, wherein X represents —SO₂—, $m$ represents 1 and A represents an ethylene radical, can be obtained by reacting a dyestuff compound of the formula:

$$D-(CH_2)_{n-1}-SO_2-CH_2CH_2-O.V$$
(Formula IV)

wherein D and $n$ have the meanings stated above and V represents the residue of a monobasic or polybasic acid, with a sulphur compound of Formula II.

This modified process may be conveniently brought about by reacting the dyestuff compound of Formula IV with the sulphur compound of Formula II in water, or in a water-miscible organic liquid such as acetone, or in a mixture of water and a water-miscible organic liquid, preferably at a temperature between 40° and 100° C., and in the presence of an acid-binding agent, adding water and/or sodium chloride and isolating the dyestuff which is precipitated.

As examples of the residues of a monobasic or polybasic acid represented by V there may be mentioned the residues of inorganic acids such as sulphuric acid and phosphoric acid, the residues of organic sulphonic acids such as methane sulphonic acid and p-toluenesulphonic acid and the residues of organic carboxylic acids such as acetic acid and benzoic acid.

The dyestuff compounds of Formula IV may be obtained by treating the corresponding dyestuff compound of the formula:

$$D-(CH_2)_{n-1}-SO_2-CH_2CH_2OH$$

wherein D and $n$ have the meanings stated above, with an acylating agent derived from a monobasic or polybasic acid. As examples of such acylating agents there may be mentioned sulphuric acid, chlorosulphonic acid, acetyl chloride, propionyl chloride, benzoyl chloride, methane sulphonyl chloride and p-toluenesulphonyl chloride.

Specific examples of dyestuff compounds of Formula IV are described in British specifications Nos. 587,467, 733,- 471, 768,241, 774,819, 776,265, 787,986 and 831,128, in German specification No. 965,902, and in Belgian specification No. 585,284.

As specific examples of classes of the new dyestuffs of the invention there may be mentioned the dyestuffs of the formula set out below, without however limiting the classes of dyestuffs of the invention to those specifically disclosed.

(a) The dyestuffs of the formula:

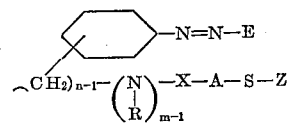

wherein E represents the residue of a coupling component which is preferably a coupling component of the naphthol or 1-aryl-5-pyrazolone series which preferably contains a sulphonic acid group, and the benzene ring optionally contains further substituents.

(b) The dystuffs of the formula:

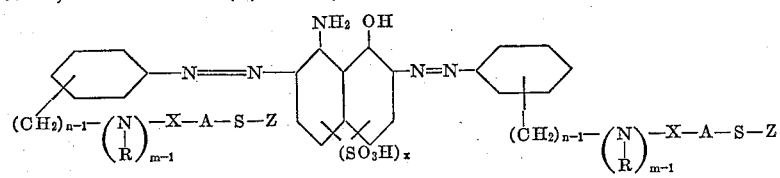

wherein $x$ represents 1 or 2 and the benzene rings optionally contain further substituents.

(c) The copper complexes of the dyestuffs of the formula.

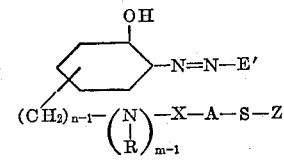

wherein E' represents the residue of a naphthol or 1-aryl-5-pyrazolone which is attached to the azo link in ortho or vicinal position to a hydroxy group and which preferably contains at least one sulphonic acid group, and the benzene ring optionally contains further substituents.

(d) The dyestuffs of the formula:

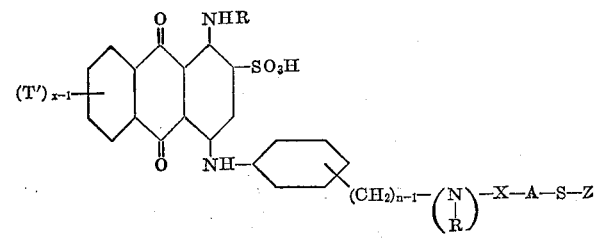

wherein $x$ represents 1 or 2 and T' represents a hydrogen or halogen atom or a sulphonic acid group.

(e) The dyestuffs of the formula:

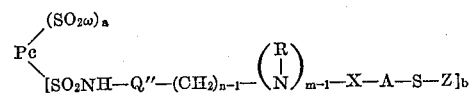

wherein $\omega$ represents a hydroxy and/or a substituted or unsubstituted amino group, Q'' represents a divalent bridging group such as an arylene group, Pc represents a phthalocyanine radical which is preferably a copper phthalocyanine radical, and $a$ and $b$ each represent a value of from 1 to 3 provided that $a+b$ does not exceed 4.

Alternatively the dyestuffs wherein D represents the radical of an azo dyestuff can be obtained by coupling a diazotised amine with a coupling component the amine or coupling component or both containing a

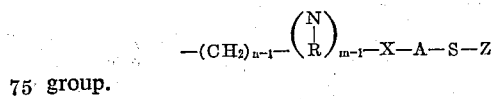

group.

This modified process may be conveniently brought about by adding sodium nitrite to a solution or suspension of the amine, which may be an aminoazo compound, in an aqueous solution of hydrochloric acid, adding the diazo solution or suspension so obtained to a solution of the coupling component and isolating, by conventional methods, the azo dyestuff which is formed.

The amines or coupling components containing the said group may themselves be obtained by treating the corresponding amine or coupling component containing a

group with a sulphur compound of Formula II.

One preferred class of the dyestuffs of the invention are the dyestuffs of the formula:

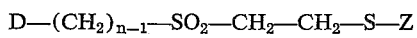

wherein D, Z and $n$ have the meanings stated above.

A second preferred class of the dyestuffs of the invention are the dyestuffs of the formula:

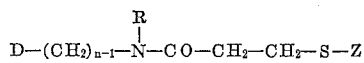

wherein D, R, Z and $n$ have the meanings stated above.

A third preferred class of the dyestuffs of the invention are the dyestuffs which, in the form of the free acids, are represented by the formula:

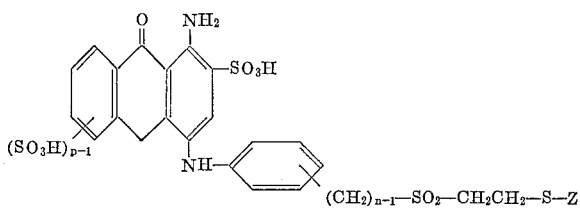

wherein Z and $n$ have the meanings stated, and $p$ represents a positive integer not exceeding 2.

In each of these preferred classes it is further preferred that $n$ represents 1.

A fourth preferred class of the dyestuffs of the invention are the dyestuffs wherein Z represents the group of the formula:

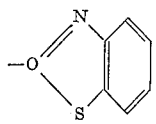

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrate, borates and dialkylmetanilic acids such as sodium diethylmetanilate, which are preferably used with sodium hydrogen sulphate.

The new dyestuffs, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile and aromatic polyester fibres. For this purpose the dyestuffs can be applied to the textile materials by dyeing, padding or printing, using in the latter case printing pastes containing the conventional thickening agents or oil-in-water emulsions or water-in-oil emulsions, whereby the textile materials are coloured in bright shades possessing excellent fastness to light and to wet treatment such as washing. It is also found that the dyestuffs build-up well on textile materials to give heavy depths of shades.

The new dyestuffs are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent can be used. Those new dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent, for example the sodium salt of sulphonated naphthalene formaldehyde condensation products, sulphosuccinic acid esters, Turkey Red Oil, alkyl phenol/ethylene oxide condensation products, soap and similar surface active materials with or without protective colloids such as dextrin, British gum and water-soluble proteins. If desired the aqueous paste may be converted to a non-dusting powder by any of the processes known for forming non-dusting powders.

The new dyestuffs, as hereinbefore defined, can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts.

For example dyeing may be started at a dyebath pH of about 3.5 to 5.5 and raised during the dyeing process to about 6.5 to 7.5 or higher if desired. The dyebath may also contain susbtances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amine, fatty alcohols or phenols, surface active cationic agents such as quaternary ammonium salts for example cetyl trimethylammonium bromide and cetyl pyridinium bromide and organic liquids such as n-butanol and benzyl alcohol.

The invention is illustrated but not limited by the following examples in which the parts and percentages are by weight.

*Example 1*

A mixture of 3 parts of 2-mercaptobenzthiazole, 0.75 part of sodium hydroxide, 10.8 parts of the disodium salt of 1 - amino-4-[3'-(β-sulphatoethylsulphonyl)anilino]anthraquinone-2-sulphonic acid and 450 parts of water is stirred at a temperature of 50° C. for 3 hours. The mixture is then filtered and 27 parts of sodium chloride are added to the filtrate so obtained. The dyestuff which is precipitated is then filtered off, washed with a 4% aqueous solution of sodium chloride and dried.

On analysis the dyestuff so obtained is found to contain 3 atoms of nitrogen and 3.9 atoms of sulphur per molecule of dyestuff. When applied to cellulose textile materials by a printing process the dyestuff yields bright reddish-blue prints which have excellent fastness to wet treatments and to light and the prints are much stronger tinctorially than prints which are obtained in a similar manner from the disodium salt of 1-amino-4-[3'-(β-sulphatoethylsulphonyl)anilino]anthraquinone - 2 - sulphonic acid.

Example 2

A mixture of 6.75 parts of sodium diethyldithiocarbamate trihydrate, 12.5 parts of the disodium salt of 1-amino-4-[3'-(β-sulphatoethylsulphonyl)anilino]anthraquinone-2-sulphonic acid and 450 parts of water is stirred for 2 hours at a temperature of 50° C. 450 parts of a 10% aqueous solution of sodium chloride are then added and the dyestuff which is precipitated is filtered off. The dyestuff paste so obtained is dissolved in 2000 parts of water at a temperature of 50° C., the solution is filtered and 100 parts of sodium chloride are added to the filtrate. The precipitated dyestuff is then filtered off, washed with a 4% aqueous solution of sodium chloride and dried.

On analysis the dyestuff so obtained is found to contain 3 atoms of nitrogen and 3.9 atoms of sulphur per molecule of dyestuff. When applied to cellulose textile materials by a printing process the dyestuff yields bright reddish-blue prints which have excellent fastness to wet treatments and to light and the prints obtained are much stronger tinctorially than prints which are obtained in a similar manner from the disodium salt of 1-amino-4-[3'-(β-sulphatoethylsulphonyl) - anilino]anthraquinone-2-sulphonic acid.

In place of the 6.75 parts of sodium diethyldithiocarbamate trihydrate used in the above example there are used 6 parts of sodium di-n-propyldithiocarbamate when a similar dyestuff is obtained.

Example 3

10.29 parts of the tetrasodium salt of 1-amino-2:7-bis-[2' - methoxy-5'-(β-sulphatoethylsulphonyl)phenylazo]-8-naphthol-3:6-disulphonic acid and 5.5 parts of sodium diethyldithiocarbamate trihydrate are dissolved in 200 parts of water and the pH of the resulting solution is adjusted to a pH of 9±0.2 by the addition of an aqueous solution of sodium hydroxide. The resulting solution is stirred for 1 hour at a temperature of 20° C. and then for 2 hours at a temperature of 60° C. 40 parts of sodium chloride are added, the mixture is cooled to 20° C. and the precipitated dyestuff is then filtered off and dried.

On analysis the dyestuff so obtained is found to contain 7 atoms of nitrogen and 7.6 atoms of sulphur per molecule of dyestuff. When applied to cellulose textile materials by a printing process the dyestuff yields dark blue shades possessing excellent fastness to wet treatments and to light.

The tetrasodium salt of the disazo compound used in the above example may be obtained by coupling 2 molecular proportions of diazotised 2-methoxy-5-(β-sulphatoethylsulphonyl)amine with one molecular proportion of 1-amino-8-naphthol-3:6-disulphonic acid.

In place of the 5.5 parts of sodium diethyldithiocarbamate trihydrate used in the above example there are used equivalent amounts of sodium N-methyl-N-ethyldithiocarbamate or sodium N-methyl-N-phenyldithiocarbamate when similar dyestuffs are obtained.

Example 4

7.97 parts of the trisodium salt of the copper complex of 1-acetylamino-7-[2'-hydroxy - 5' - (β-sulphatoethylsulphonyl)phenylazo]-8-naphthol-3:6-disulphonic acid and 2.84 parts of the sodium salt of 2-mercaptobenzthiazole are dissolved in 300 parts of water and the pH of the resulting solution is adjusted to 9.2±0.2 by the addition of an aqueous solution of sodium hydroxide. The solution so obtained is stirred for 1 hour at a temperature of 20° C., and then for 2 hours at a temperature of 60° C. 60 parts of sodium chloride are then added, the solution is cooled to 20° C. and the precipitated dyestuff is filtered off and dried.

On analysis the dyestuff so obtained is found to contain 4 atoms of nitrogen and 4.98 atoms of sulphur per molecule of dyestuff.

When applied to cellulose textile materials by a dyeing or a printing process the dyestuff yields reddish-violet shades possessing excellent fastness to wet treatments and to light.

The trisodium salt of the copper complex used in the above example may be obtained by coupling diazotised 4 - (β-sulphatoethylesulphonyl) - 2 - aminophenol with 1 molecular proportion of 1-acetylamino-8-naphthol-3:6-disulphonic acid in the presence of sodium carbonate and subsequently heating the azo compound so obtained with an aqueous solution of copper sulphate.

Example 5

5 parts of a 13.8% aqueous solution of sodium nitrite are added with stirring to a solution of 3.3 parts of 4-amino - ω - (N:N - diethylthiocarbamylthio)acetanilide in 32.5 parts of a 1.7% aqueous solution of hydrochloric acid at a temperature between 0° and 2° C., and the resulting mixture is stirred for 10 minutes at the same temperature. The diazo solution so obtained is then added with stirring to a solution of 4.45 parts of the disodium salt of 1-amino-8-naphthol-3:6-disulphonic acid in 45 parts of a 4.4% aqueous solution of sodium carbonate. The mixture is stirred for 2 hours and the dyestuff which is precipitated is then filtered off. The dyestuff paste so obtained is mixed with 0.79 part of potassium dihydrogen phosphate and 0.41 part of disodium hydrogen phosphate and the resulting mixture is then dried.

The dyestuff so obtained when applied to cellulose textile materials in conjunction with a treatment with an acid-binding agent yields violet shades which possess very good fastness to washing.

The 4 - amino - ω - (N,N - diethylthiocarbamylthio)acetanilide used in the above example may be obtained in the form of its hydrochloride as follows:

A solution of 28 parts of sodium diethyldithiocarbamate trihydrate in 50 parts of water is added during five minutes to a solution of 18.0 parts of 4-nitro-ω-chloroacetanilide in 350 parts of ethanol which is stirred at the boil under a reflux condenser. The mixture is then stirred at the boil for 30 minutes and is filtered. The resulting filtrate is cooled when 4-nitro-ω-(N:N-diethylthiocarbamylthio)acetanilide separates out and is filtered off and washed with ethanol. The resulting solid is stirred with water and the solid again filtered off, washed with a little water and dried. After crystallisation from ethanol the product melts at 129° to 130° C.

A solution of 48 parts of sodium hydrosulphite dihydrate and 45 parts of sodium hydrogen carbonate in 200 parts of water is added as rapidly as possible to a solution of 15 parts of the 4-nitro-ω-(diethylthiocarbamylthio)acetanilide in 175 parts of ethanol which is stirred at the boil under a reflux condenser. 550 parts of water are then added, the mixture is cooled to 20° C. and extracted 3 times with a total of 400 parts of ethyl acetate. The ethyl acetate extract is dried and the ethyl acetate is removed by distillation in a vacuum. The residual oil is dissolved in 10 parts of ethanol and 16 parts of a 10% ethereal solution of hydrogen chloride are added. The hydrochloride which is precipitated is filtered off, washed with ether and crystallised from ethanol when 4-amino-ω - (N:N-diethylthiocarbamylthio)acetanilide hydrochloride is obtained in the form of colourless plates which melt at 260° C.

The following table gives further examples of the new dyestuffs of the invention which are obtained substantially as described in Example 5 by diazotising the amino listed in the second column of the table and coupling the diazo compound so obtained with the coupling component listed in the third column of the table. The fourth column of the table indicates the shades obtained when the dyestuffs are applied to cellulose in conjunction with a treatment with an acid-binding agent.

| Example | Amine | Coupling Component | Shade |
|---|---|---|---|
| 6 | 4-amino-ω-(benzthiazol-2'-ylthio)acetanilide. | 1-acetylamino-8-naphthol-3:6-disulphonic acid. | Violet. |
| 7 | ----do---- | 1-(2':5'-dichloro-4'-sulphophenyl)-3-methyl-5-pyrazolone. | Orange. |
| 8 | ----do---- | 1-benzoylamino-8-naphthol-3:6-disulphonic acid. | Violet. |
| 9 | 4-[ω(N:N-diethylthiocarbamylthio)acetyl] aniline. | ----do---- | Do. |
| 10 | ----do---- | 1-(2':5'-dichloro-4'-sulphophenyl)-3-methyl-5-pyrazolone. | Orange. |
| 11 | ----do---- | 1-acetylamino-8-naphthol-3:6-disulphonic acid. | Violet. |
| 12 | 4-[ω-(benzthiazol-2'-ylthio)acetyl] aniline. | ----do---- | Do. |
| 13 | ----do---- | 1-(2':5'-dichloro-4'-sulphophenyl)-3-methyl-5-pyrazolone. | Orange. |
| 14 | 3-amino-β-(N:N-diethylthiocarbamylthio) propionanilide-4-sulphonic acid. | ----do---- | Yellow. |
| 15 | ----do---- | 1-acetylamino-8-naphthol-3:6-disulphonic acid. | Red. |
| 16 | ----do---- | 1-benzoylamino-8-naphthol-3:6-disulphonic acid. | Bluish-red. |
| 17 | 3-amino-β-(benzthiazol-2'-ylthio)propionanilide-4-sulphonic acid. | 1-benzoylamino-8-naphthol-3:6-disulphonic acid. | Do. |
| 18 | ----do---- | 1-acetylamino-8-napthol-3:6-disulphonic acid. | Red. |
| 19 | ----do---- | 1-(2':5'-dichloro-4'-sulphophenyl)-3-methyl-5-pyrazolone. | Yellow. |
| 20 | 3-amino-β-(N:N-diphenylthiocarbamylthio)-propionanilide-4-sulphonic acid. | 1-acetylamino-8-naphthol-3:6-disulphonic acid. | Red. |
| 21 | 3-amino-β-[(N:N-pentamethylene)thiocarbamylthio]-propionanilide-4-sulphonic acid. | ----do---- | Do. |
| 22 | 3-amino-β-(N:N-diethylthiocarbamylthio) propionanilide-4-sulphonic acid. | 2-(3'-sulphophenylamino)-8-naphthol-6-sulphonic acid. | Brown. |
| 23 | ----do---- | 2-naphthol-6:8-disulphonic acid. | Orange. |
| 24 | ----do---- | 2-acetylamino-5-naphthol-7-sulphonic acid. | Do. |
| 25 | 3-amino-3-(N:N-dimethylthiocarbamylthio) propionanilide-4-sulphonic acid. | 2-naphthol-3:6-disulphonic acid. | Do. |
| 26 | 3-amino-β-(N:N-dimethylthiocarbamylthio)-propionanilide-4-sulphonic acid. | 2-ureido-5-naphthol-7-sulphonic acid. | Do. |
| 27 | ----do---- | 1-naphthol-4-sulphonic acid. | Scarlet. |
| 28 | ----do---- | 1-amino-8-naphthol-3:6-disulphonic acid. | Bluish-red. |

The 4-amino-ω-(benzthiazol-2'-ylthio)acetanilide used in the above examples may be obtained as follows:

A solution of 18.9 parts of the sodium salt of 2-mercaptobenzthiazole in 55 parts of water is added to a solution of 21.45 parts of 4-nitro-ω-chloracetanilide in 175 parts of ethanol. The mixture is stirred for 30 minutes at 20° C. and then the solution is stirred for 15 minutes at the boil under a reflux condenser. The solution is cooled to 20° C. and the 4-nitro-ω-(benzthiazol-2'-thio)acetanilide which separates out is filtered off and dried. It crystallises from n-propanol in the form of white needles which melt at 161° C. to 161.5° C.

A suspension of 22 parts of the 4-nitro-ω-(benzthiazol-2'-ylthio)acetanilide in 300 parts of ethyl acetate is treated for 24 hours with hydrogen in the presence of Raney nickel catalyst at a temperature of 20° C. and at atmospheric pressure. The mixture is then heated until boiling, filtered and the filtrate cooled when 4-amino-ω-(benzthiazol - 2' - thio)acetanilide separates out and is filtered off and dried. The product crystallises from ethyl acetate in the form of white needles which melt at 149° C. to 150° C. The 4-[ω-(N:N-diethylthiocarbamylthio)acetyl]aniline used in the above examples may be obtained as follows:

A solution of 34.0 parts of sodium diethyldithiocarbamate trihydrate in 50 parts of water is added to a solution of 16.95 parts of 4-ω-chloracetylaniline in 200 parts of ethanol which is stirred at the boil under a reflux condenser and the resulting mixture is stirred at the boil for 10 minutes. The mixture is then filtered and 100 parts of water are added to the filtrate. The product which crystallises out is then filtered off and crystallised from ethanol to give yellowish-brown crystals which melt at 107° to 108° C.

The 4-[ω-(benzthiazol-2'-ylthio)acetyl]aniline used in the above examples may be obtained by replacing the 34.0 parts of sodium diethyldithiocarbamate trihydrate used in the preparation of 4-ω-(N:N-diethylthiocarbamylthioacetyl)anilide by 29 parts of the sodium salt of 2-mercaptobenzthiazole. The resulting product melts at 153° to 155° C.

The 3 - amino - β - (N:N-diethylthiocarbamylthio)propionanilide-4-sulphonic acid used in the above examples may be obtained as follows:

A solution of 33 parts of sodium diethyldithiocarbamate trihydrate and 40 parts of the sodium salt of 3-amino-chloropropionanilide-4-sulphonic acid in 600 parts of water is stirred for 20 hours at a temperature of 20° C. 160 parts of sodium chloride are then added and the resulting product is filtered off and dried.

The 3-amino-β-(benzthiazol-2'-ylthio)propionanilide-4-sulphonic acid used in the above examples may be obtained by the method described for 3-amino-β-(N:N-diethylthiocarbamylthio)propionanilide-4-sulphonic acid except that the 33 parts of sodium diethyldithiocarbamate trihydrate are replaced by 29 parts of the sodium salt of 2-mercaptobenzthiazole.

The 3 - amino-β-(N:N-diphenylthiocarbamylthio)-propionanilide-4-sulphonic acid, 3-amino-β-[(N:N-pentamethylene)thiocarbamylthio]propionanilide - 4-sulphonic acid and 3-amino-β-(N:N-dimethylthiocarbamylthio)propionanilide-4-sulphonic acid used in the above examples may be obtained by the method described above for 3-amino-β-(N:N - diethylthiocarbamylthio)propionanilide - 4 - sulphonic acid except that the 33 parts of sodium diethyldithiocarbamate trihydrate are replaced by equivalent amounts of sodium diphenyldithiocarbamate, sodium pentamethylenedithiocarbamate and sodium dimethyldithiocarbamate respectively.

*Example 29*

A solution of 1.8 parts of 2-mercaptobenzthiazole and 0.44 part of sodium hydroxide in 12 parts of water is added to a solution of 10 parts of the sodium salt of copper phthalocyanine-3-sulphon-N-[3'-(β-sulphatoethylsulphonyl)phenyl]amide sulphonic acid (which is obtained as described below) in 1300 parts of water, and the resulting mixture is stirred for 3 hours at 50° C. The mixture is then cooled to 20° C., 150 parts of sodium chloride are added, and the precipitated dyestuff is filtered off and dried.

When applied to cellulose textile materials in conjunction with a treatment with an acid-binding agent the dyestuff yields turquoise shades possessing excellent fastness to wet treatments.

The sodium salt of copper phthalocyanine-3-sulphon-N-[3'-(β-sulphatoethylsulphonyl)phenyl]amide sulphonic acid used in the above example may be obtained as follows:

A mixture of 14.4 parts of copper phthalocyanine and 164 parts of chlorosulphonic acid is stirred for 4 hours at 135° to 140° C. The mixture is then cooled to 20° C., poured on to ice, and the precipitated copper phthalocyanine sulphonchloride is filtered off and washed with cold water. The sulphonchloride is stirred with a mixture of 120 parts of water and 120 parts of ice and an aqueous solution of sodium hydroxide is added until the mixture is neutral to methyl orange. 9 parts of m-aminophenyl-β-hydroxyethyl sulphone hydrochloride, 80 parts of acetone and 20 parts of sodium bicarbonate are added and the mixture is then stirred for 16 hours at 20° C. A concentrated aqueous solution of hydrochloric acid is then added and the precipitated solid is filtered off and dried. 10 parts of this solid are added to a mixture of 35.4 parts of chlorosulphonic acid and 100 parts of pyridine at a temperature below 30° C., and the resulting mixture is then stirred for 3 hours at 95° C. The mixture is then cooled to 20° C., poured into 500 parts of a saturated aqueous solution of sodium chloride and the precipitated solid is filtered off, washed with a saturated aqueous solution of sodium chloride and dried.

*Example 30*

In place of the 1.8 parts of 2-mercaptobenzthiazole and 0.44 part of sodium hydroxide used in Example 29 there are used 2.45 parts of sodium diethyldithiocarbamate trihydrate when a similar dyestuff is obtained.

*Example 31*

In place of the 10 parts of the sodium salt of copper phthalocyanine-3-sulphon-N-[3'-(β-sulphatoethylsulphonyl)-phenyl]amide sulphonic acid used in Examples 29 and 30 there are used 10.2 parts of the sodium salt of copper phthalocyanine - 3-sulphon - N - [3' - (β-sulphatoethylsulphonylmethyl) - 4' - methylphenyl]amide sulphonic acid when similar dyestuffs are obtained.

The said copper phthalocyanine derivative used in this example may be obtained by the method described in Example 29 for the preparation of the copper phthalocyanine derivative used in Example 29 except that the 9 parts of m-aminophenyl-β-hydroxyethylsulphone hydrochloride are replaced by 8.6 parts of 5-amino-2-methylbenzyl-β-hydroxyethylsulphone and the 20 parts of sodium bicarbonate are replaced by 16.8 parts of sodium bicarbonate.

*Example 32*

In place of the 3 parts of 2-mercaptobenzthiazole used in Example 1 there are used equivalent amounts of 2-mercaptobenzthiazole-5-sodium sulphonate, 2-mercaptobenzoxazole, 2-mercaptobenzselenazole, sodium salt of 2-mercaptobenzthiazole-6-carboxylic acid, 2-mercaptobenzoxazole-5-sodium sulphonate or 6-nitro-2-mercaptobenzthiazole when similar dyestuffs are obtained.

*Example 33*

A solution of 3.4 parts of 2-mercaptobenzthiazole and 0.8 part of sodium hydroxide in 100 parts of water is added to a solution of 10.1 parts of the sodium salt of 1-amino - 4 - [3'-(vinylsulphonyl)anilino]anthraquinone-2-sulphonic acid in 350 parts of water at a temperature of 50° C., and the resulting mixture is stirred for 3 hours at this temperature. The mixture is then cooled to 20° C., 22.5 parts of sodium chloride are added and the precipitated dyestuff is filtered off, washed with a 5% aqueous solution of sodium chloride and dried. The dyestuff so obtained is identical with the dyestuff of Example 1.

*Example 34*

In place of the 10.1 parts of the sodium salt of the anthraquinone compound used in Example 33 there are used 13.2 parts of the disodium salt of 1-amino-4-[3'-(β-sulphatoethylsulphonylmethyl) - 4'-methylanilino]anthraquinone-2-sulphonic acid when a dyestuff is obtained which gives blue shades on cellulose textile materials when applied by a printing process in conjunction with a treatment with an acid-binding agent.

*Example 35*

A mixture of 3.2 parts of the disodium salt of 2-mercaptobenzthiazole-5-sulphonic acid, 5.07 parts of the sodium salt of 1-amino-4-[4'-(chloroacetylamino)anilino]anthraquinone-2-sulphonic acid and 250 parts of water is stirred for 4 hours at a temperature of 60° C. The mixture is then filtered and 15 parts of sodium chloride are added to the resulting filtrate. The dyestuff which is precipitated is then filtered off, washed with a 5% aqueous solution of sodium chloride and dried.

When applied to cellulose textile materials in conjunction with a treatment with an acid-binding agent the dyestuff yields greenish-blue shades which possess excellent fastness to wet treatments.

*Example 36*

In place of the 5.07 parts of the sodium salt of the anthraquinone compound used in Example 35 there are used 5.21 parts of the sodium salt of 1-amino-4-[4'-(chloroacetyl - N - methylamino)anilino]anthraquinone - 2-sulphonic acid when a similar dyestuff is obtained.

*Example 37*

12.32 parts of the disodium salt of the monoaza compound obtained by coupling diazotised 3-(β-sulphatoethylsulphonylamino)aniline with 1-(2'-methyl-5'-chloro-4'-sulphophenyl)-3-methyl-5-pyrazolone, and 3.98 parts of the sodium salt of 2-mercaptobenzthiazole are dissolved in 200 parts of water end the pH of the solution is raised to between 9.0 and 9.2 by the addition of an aqueous solution of sodium hydroxide. The resulting solution is stirred for 1 hour at 20° C., then for 2 hours at 60° C. 40 parts of sodium chloride are added, the mixture is cooled to 20° C., and the precipitated dyestuff is filtered off and dried.

When applied to cellulose textile materials in conjnuction with a treatment with an acid-binding agent the dyestuff yields reddish-yellow shades which possess excellent fastness to wet treatments.

*Example 38*

A printing paste comprising

|  | Parts |
|---|---|
| Dyestuff of Example 1 | 2 |
| Urea | 10 |
| Water | 50.5 |
| 4% aqueous solution of sodium alginate | 35 |
| Sodium bicarbonate | 1.5 |
| Sodium m-nitrobenzenesulyhonate | 1 |
|  | 100 | is applied to a woven cotton cloth by roller printing, and the printed cotton cloth is then dried at 60° C. The printed cotton cloth is steamed for 5 minutes at a temperature of 100° C., and is then washed in water. The printed cotton cloth is then immersed for 10 minutes, at a temperature of 100° C., in a 0.3% aqueous solution of an alkylphenol/ethylene oxide condensate, rinsed, in water and finally dried. The cotton cloth is thereby printed a bright reddish-blue shade possessing excellent fastness to light and to wet treatments.

*Example 39*

100 parts of bleached cotton yarn are immersed in a dyebath comprising a solution of 2 parts of the dyestuff of Example 1 and 90 parts of sodium chloride in 3000 parts of water, and dyeing is then carried out for 30 minutes at a temperature of 60° C. 15 parts of sodium carbonate are then added and dyeing is continued for a further 90 minutes at 60° C. The dyed cotton yarn is then removed from the dyebath, rinsed in water, immersed for 5 minutes in a 0.3% aqueous solution of a synthetic detergent at a temperature of 100° C., rinsed again in water and finally dried. The cotton yarn is dyed a bright reddish-blue shade possessing excellent fastness to light and to wet treatments.

Example 40

A mixture of 12.5 parts of the disodium salt of 1-amino-4-[3'-(β-sulphatoethylsulphonyl)anilino] - anthraquinone-2-sulphonic acid, 5.55 parts of the sodium salt of morpholine-N-carbodithioic acid

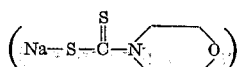

and 500 parts of water is stirred for 3 hours at 60° C. The mixture is then filtered and 25 parts of sodium chloride are added to the resulting filtrate. The dyestuff which is precipitated is then filtered off, washed with a 5% aqueous solution of sodium chloride and dried.

When applied to cellulose textile materials in conjunction with a treatment with an acid-binding agent the dyestuff yields reddish-blue shades which have excellent fastness to light and to wet treatments.

The following table gives further examples of dyestuffs of the invention which are obtained when the 7.97 parts of the trisodium salt of the copper complex used in Example 4 are replaced by equivalent amounts of the sodium salts of the copper complexes of the azo compounds listed in the second column of the table, and/or the 2.84 parts of the sodium salt of 2-mercaptobenzthiazole used in Example 4 are replaced by equivalent amounts of the sulphur compounds listed in the third column of the table. The fourth column of the table indicates the shades obtained when the dyestuffs are applied to cellulose textile materials in conjunction with a treatment with an acid-binding agent.

| Ex. | Azo Compound | Sulphur Compound | Shade |
|---|---|---|---|
| 41 | 2-acetylamino-6-[2'-hydroxy-5'-(β-sulphatoethylsulphonyl)-phenylazo]-5-naphthol-7-sulphonic acid. | Sodium diethyldithiocarbamate | Rubine. |
| 42 | ___do___ | 2-mercaptobenzoxazole | Do. |
| 43 | 2-N-methyl-N-acetylamino-6-[2'-hydroxy-5'-(β-sulphatoethylsulphonyl)phenylazo]-5-naphthol-7-sulphonic acid. | Sodium dimethyldithiocarbamate | Do. |
| 44 | 1-amino-7-[2'-hydroxy-5'-(β-sulphatoethylsulphonyl)phenylazo]-8-naphthol-3:6-disulphonic acid. | ___do___ | Violet. |
| 45 | ___do___ | Sodium salt of 2-mercaptobenzthiazole. | Do. |
| 46 | ___do___ | Sodium di-n-butyldithiocarbamate. | Do. |

What we claim is:

1. Dyestuffs of the formula:

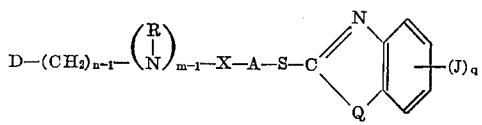

wherein

D is a dyestuff radical selected from the group consisting of azo, anthraquinone and phthalocyanine dyestuff radicals, which contain at least one water-solubilising group selected from the class consisting of carboxylic acid and sulphonic acid groups, and where the

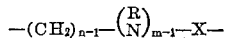

group is attached to a carbon atom of an aryl ring present in the dyestuff radical D;

A represents a lower alkylene radical;
X represents a bridging group selected from the group consisting of —SO₂— and —CO—;
R represents a member selected from the group consisting of hydrogen and lower alkyl;
m and n each independently represent a positive integer not exceeding 2;
Q represents a divalent atom selected from the group consisting of oxygen, sulphur and selenium atoms;
J represents a radical selected from the group consisting of nitro, sulphonic acid and carboxylic acid radicals; and
q is one of the numbers 0, 1 and 2.

2. Dyestuffs of the formula:

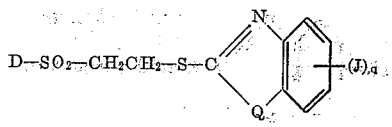

wherein

D is a dyestuff radical selected from the group consisting of azo, anthraquinone and phthalocyanine dyestuff radicals, which contain at least one water-solubilising group selected from the class consisting of carboxylic acid and sulphonic acid groups, and where the —SO₂— group is attached to a carbon atom of an aryl ring present in the dyestuff radical D;
Q represents a divalent atom selected from the group consisting of oxygen, sulphur and selenium atoms;
J represents a radical selected from the group consisting of nitro, sulphonic acid and carboxylic acid radicals; and
q is one of the numbers 0, 1 and 2.

3. Dyestuffs of the formula:

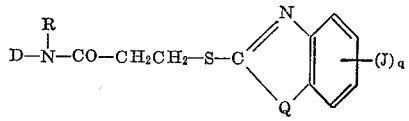

wherein

D is a dyestuff radical selected from the group consisting of azo, anthroquinone and phthalocyanine dyestuff radicals, which contain at least one water-solubilising group selected from the class consisting of carboxylic acid and sulphonic acid groups, and where the

group is attached to a carbon atom of an aryl ring present in the dyestuff radical D;
R represents a radical selected from the group consisting of hydrogen and lower alkyl;
Q represents a divalent atom selected from the group consisting of oxygen, sulphur and selenium atoms;
J represents a radical selected from the group consisting of nitro, sulphonic acid and carboxylic acid radicals; and
q is one of the numbers 0, 1 and 2.

4. Dyestuffs of the formula:

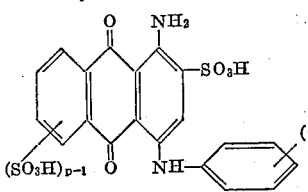 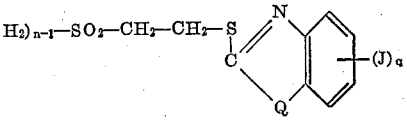

wherein
$n$ and $p$ each independently represent a positive integer not exceeding 2;
Q represents a divalent atom selected from the group consisting of oxygen, sulphur and selenium atoms;
J represents a radical selected from the group consisting of nitro, sulphonic acid and carboxylic acid radicals; and
$q$ is one of the numbers 0, 1 and 2.

5. The dyestuff of the formula:

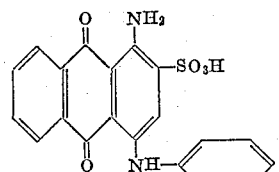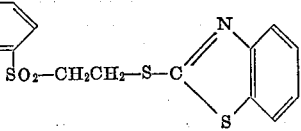

6. Dyestuff of the formula:

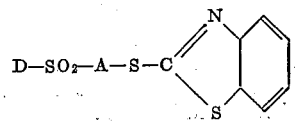

wherein
D is an anthroquinone dyestuff radical containing at least one water-solubilising group selected from the class consisting of carboxylic acid and sulphonic acid groups, and where the —$SO_2$— group is attached to a carbon atom of an aryl ring present in the dyestuff radical D and A is lower alkylene.

No references cited.

HENRY R. JILES, *Acting Primary Examiner.*
NICHOLAS S. RIZZO, *Examiner.*
ALTON D. ROLLINS, *Assistant Examiner.*